July 10, 1973  R. FOURNIER  3,745,096

NONSTICK TREATMENT OF MOLD CAVITIES

Filed Nov. 9, 1970  2 Sheets-Sheet 1

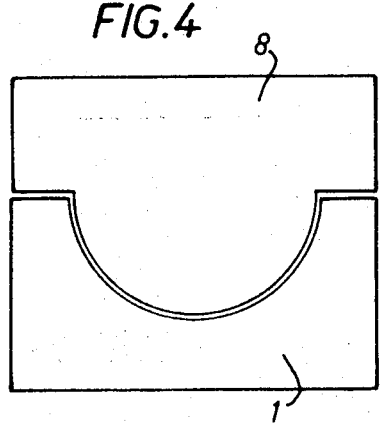
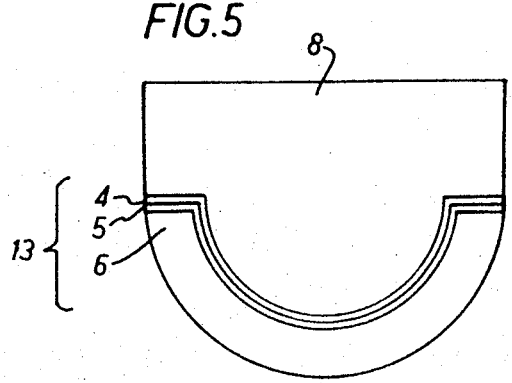
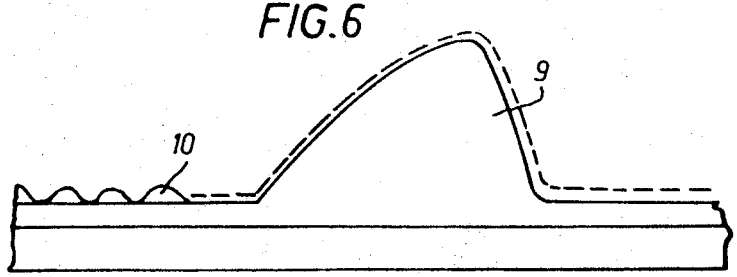
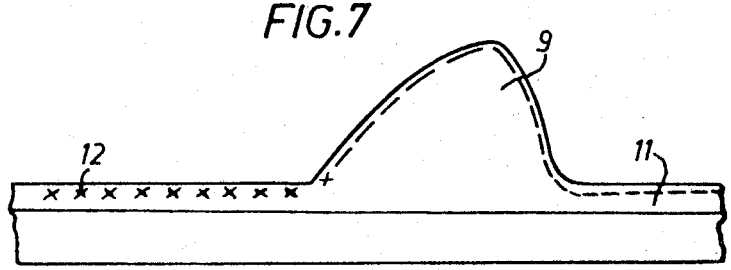

United States Patent Office 3,745,096
Patented July 10, 1973

3,745,096
NONSTICK TREATMENT OF MOLD CAVITIES
Roger Fournier, Billancourt, Hauts-de-Seine, France, assignor to Regie Nationale des Usines Renault, Billancourt, and Automobiles Peugeot, Paris, France
Filed Nov. 9, 1970, Ser. No. 87,738
Claims priority, application France, Nov. 12, 1969, 6938752
Int. Cl. C23b 5/60, 5/06
U.S. Cl. 204—20                                    1 Claim

ABSTRACT OF THE DISCLOSURE

A method of applying a nonstick treatment to the inner surface of a mould in order to facilitate the stripping of articles of synthetic or natural material having relief designs on their surface, which is to be subsequently coated definitely or provisionally with any material to be applied closely to the aforesaid relief designs, in which there is deposited on the inner mould surface, by reduction of its salt, a chemical layer of copper, if the mould material comprises pores permitting a suitable anchoring of the metal thereto, whereafter a relatively thick base layer of metal such as copper or nickel is deposited electrolytically to reproduce very truly the mould pattern, and a fine chromium film having the desired nonstick properties is eventually formed also electrolytically thereon.

---

The present invention relates to a method of moulding articles of synthetic material, and more particularly to means for facilitating the stripping of such articles and permit the subsequent painting thereof.

It is customary, before moulding articles of synthetic material and notably of a material having cellular structure and a surface skin in moulds which may also consist of synthetic material, to spray a stripping compound consisting generally of a silicone grease on the inner surface of the mould.

This method is objectionable for the following reasons:

The articles thus obtained, especially if they are of contorted surface configuration, tend to retain traces of the nonstick products (especially silicone-containing compounds) which, having even at very low concentration a very pronounced anti-wetting capacity, practically inhibit a proper distribution of the paint subsequently spread on the surface of the article.

This problem is also encountered in manufacture of metal pieces in precision foundry where a similar procedure is applied with a view to obtain a final impression in which the molten metal can be cast:

In a first injection-moulding chill, a pattern of lost material, such as wax, is cast to a shape complementary to the chill shape; to prevent the undesired adherence of the chill material to the lost wax, a silicone stripping agent is used of which traces usually adhere to the wax pattern during the removal thereof, thus preventing a perfect covering of the pattern by the material (generally of the ceramic type) constituting the final mould proper. Under these conditions long and costly cleaning operations must be performed on the intermediate wax pattern, sometimes by using supersonic-wave devices.

It is the object of the present invention to avoid inconveniences by avoiding the use of stripping agents which are difficult to eliminate; to this end, the present invention consists essentially in taking advantage of the nonsticking properties of chromium, which is thus deposited as a thin film having nevertheless all the necessary and desired strength on the inner surface of the mould, without altering the pattern which is to be reproduced on the surface of the manufactured article. However, it may be noted that it would not constitute a departure from the basic principle of this invention to cover the chromium surface, if necessary, with a thin layer of any stripping compound provided that the latter can easily be removed therefrom.

In view of the foregoing, the method of this invention is characterized in that there is deposited in succession, on the inner surface of the mould, a layer of chemical copper or nickel obtained by reducing the corresponding salt, then by electro-plating a copper film about 50-micron thick reproducing with fidelity the signs printed or etched on the inner surface of the mould, and, still by electro-plating, a thin film of chromium of which the surface condition reproduces with high fidelity the relief patterns of the underlying layers, said chromium layer being smooth enough to avoid any adherence with the material constituting the article subsequently shaped in said mould.

The attached drawings illustrate diagrammatically by way of example three different forms of embodiment of the method of this invention. In the drawings:

FIGS. 4 and 5 illustrate other modifications wherein an intermediate step consists in utilizing a punch having a shape complementary to the mould shape, and FIGS. 6 and 7 show on a considerably enlarged scale a section illustrating the condition of the surface chromium film to which a mat appearance is imparted by resorting to two different methods.

Figure 1:
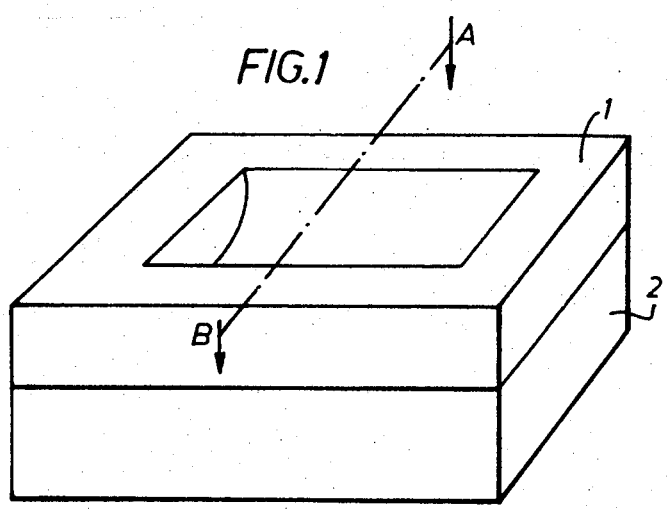
FIG. 1 illustrates in perspective a half-mould of the composite type according to this invention.

The nonstick treatment method according to this invention, as applied to the inner surface of a mold, is intended more particularly for use in the manufacture of articles of cellular synthetic material comprising a skin having the appearance of natural leather, and relates essentially to materials used for making moulds, which are of the polyester lamellar structure type. Metal deposits obtained by electro-chemical processes do not adhere in a satisfactory manner to polyesters, which in any case have non-conducting surfaces. To avoid these inconveniences and ensure a sufficient cohesion between the polyester surface and the layers deposited by electrolysis, as well as a proper conductivity of the mould surface, this surface is treated beforehand as follows:

First, the polyester mould 1 (see FIG. 1), after having separated its reinforced base 2 therefrom, is thoroughly cleaned in order to remove any traces of grease therefrom, for example by spraying suitable solvents such as dichloropropane thereon, the mould being of course already etched or provided with the printed pattern to be reproduced on the surface of the final moulded object.

Second, after drying, the mould element 1 is coated with a varnish layer 4 (see FIG. 2) containing very minute conducting particles; a similar result may be obtained by using fine silver particles or particles of similar granulometry of copper, zinc, aluminum or carbon; as a rule, this varnish is of the cellulose type, but of course this choice should not be considered as limiting the scope of the invention.

As a consequence of this coating, forming a layer sufficiently thin to avoid any undesired alteration of the underlying etched pattern, the mould is conducting, due of course to the presence of metal particles in the varnish.

In order to improve the adherence of the above-described layer to the polyester mould surface, it is advantageous to incorporate in the varnish composition already containing said conducting metal particles one or more additives, in this case of the epoxy resin type (Araldite) providing strong bonds between the varnish and the mould surface.

This conducting coating is nevertheless objectionable because the varnish thus applied can be attacked by certain electrolytic liquids in which it may be immersed at a later stage for depositing the metal film thereon, notably when contacting alkaline electrolytic baths as used on account of their strong penetrating capacity.

A complementary metal film 5 is subsequently deposited by a chemical process, that is by low-temperature reduction of a copper or nickel salt until a film of about 3–4 microns is obtained. Thus, for example, a copper sulfate or nickel sulfate solution in alkaline medium (pH 8–10) may be used wherein the metal ions form complexes with the ammonium ions. The reducing agent commonly used in this case is a sodium hypophosphite or a borasol. These substances may include conventional stabilizing and regulating agents for retarding the reducing reaction so that the bath can be used for a longer time period.

After rinsing and drying this film, the next step can be performed; it consists in depositing a copper or nickel base layer 6 by an electrolytic process, since the mould surface previously obtained is conducting and adheres strongly to the underlying polyester.

If the mould material is not of the polyester or epoxy type involving the problems set forth hereinabove, and if the mould material is of the ABS type (Acrylonitryle-Butadiene-Styrene) or consists of polypropylene, permitting a reliable anchoring of the metal layers or films by an electrolytic process, the above-described preceding step consisting in coating the inner surface of the mould with a varnish containing conducting particles may be dispensed with, and the film of chemical copper or nickel is deposited directly by reducing the corresponding salt.

However, in this case the surface to be coated is glazed beforehand by attacking the surface of said material with a concentrated sulfochromic solution; the pores thus formed in the synthetic material ensure a strong, reliable anchoring of the subsequent metal films (such as chemical copper).

Under these conditions, the following operations are common, irrespective of the specific materials used for making the mould (i.e. whether of the polyester or ABS type). These operations consist firstly in forming a relatively thick copper or nickel deposit (of the order of 50 microns).

Two methods are applicable, according to the specifications to be adhered to:

A method of depositing the metal by an electrochemical process in an acid medium, which, in case the mould consists of polyester-type materials requiring the presence of varnish containing metal particles, is advantageous in that said varnish is not impaired or attacked, thus permitting of dispensing with the above-mentioned step consisting in forming a chemical copper deposit by copper salt reduction.

The composition of this copper-plating bath may consists for example:
Of an aqueous copper sulfate solution of 250 g. per liter of water,
Sulfuric acid (50 g. per liter of water),
Possibly, glazing and/or levelling agents.

Another example of acid nickel-plating bath also suitable for this purpose would be a Watt-type bath comprising a 300 g./liter aqueous solution of nickel sulfate, and boric acid reducing the pH of the bath to about 4.

The other method suitable for depositing a base layer consists of the electrolysis of an alkaline bath having a higher penetrating capacity than an acid bath but objectionable on the other hand in that it is liable to attack the varnishes previously used for constituting the coating fixing the conducting particles to the mould surface. Under these conditions a chemical copper or nickel layer must be used.

This bath could have for instance the following composition:
Copper cyanide in the proportion of 50 g. per liter of water,
Possibly, levelling and/or glazing agents,
Sodium cyanide in excess to the amount necessary for dissolving copper cyanide, so that about 20 g. per liter of free cyanide is present in the solution. Thus, this bath contains a complex of the $[(CN)_3N_2]Cu^+$ type.

Another type of alkaline bath is obtained by substituting pyrophosphates for the cyanided copper.

Thus, when the mould 1 is coated with this copper or nickel base layer 6 these metal-coating operations are completed by electrolytically depositing a thin film of chromium 7 having a thickness of only a few microns (3 or $4\mu$) which may be bright or mat, according to the desired effect contemplated for the moulded piece or article of synthetic material.

The appearance of the surface condition of the chromium layer is subordinate to certain parameters such as temperature, the pH and concentration of the electrolytic baths. A mat appearance is obtained by forming, on the flat faces 11 lined by relief portions 9 of the pattern reproduced on the chromium-plated surface, multiple and closely-spaced micro-reliefs 10 having smooth micro-surfaces (see FIG. 6), or by leaving the flat chromium-plated surfaces free of said micro-reliefs 10 but crystallizing the surface layer of this deposited film, as illustrated at 12 in FIG. 7.

A modified form of embodiment of the above-described method consists in coating or embedding completely the upper portion 1 of the half-mould, said upper portion 1 comprising the moulding cavity or impression (see FIG. 3), with all the metal layers 3, in contrast to the preceding example (FIG. 2) in which only the moulding cavity or impression was coated with the various layers or films. Thus, a still stronger adherence of layers 3 to the mould material is obtained.

According to another modified form of embodiment of the invention and as illustrated diagrammatically in FIGS. 4 and 5, there is formed from the mould of synthetic material an element of complementary shape or "punch" also of synthetic material which reproduces the positive or reverse form of the mould pattern; on this punch the following layers are deposited in the same manner as described hereinabove:
4 Varnish coats containing copper or nickel particles,
5 Chemical copper or nickel films,
6 Base copper or nickel films of a thickness sufficient for imparting a good rigidity to the resulting shell 13 which is subsequently removed from said punch. Considering this operation and the fact that a strong adherence between the punch 8 and the metal films 13 is undesirable, the varnish containing conducting particles and constituting the first optional layer is free of any additive improving the aforesaid adherence (Araldite epoxy resin or the like).

The shell 13 then provided with the same pattern as that etched or impressed in the original mould 1 is to be used subsequently for producing articles of cellular structure material having the appearance of leather; to this end, however, the silver-containing varnish possibly deposited beforehand as a first coat on the punch 8 must be removed, this varnish then appearing on the inner surface of the metal shell 13, a chromium nonstick layer being then substituted therefor.

Then according to cases the metal particles are attacked with conventional means (nitric acid, sulfo-chromic solution, etc.) and/or the varnishes bonding them, through any suitable means (organic solvents, alkaline solutions, etc.).

Then, after a rinsing operation the terminal chromium nonstick layer is deposited.

It will be noted that this method should not be construed as being strictly limited to the manufacture of cellular synthetic material covered with a skin having the grain and appearance of leather, since this invention covers all precision moulding processes usually based to the use of nonstick agents of the silicone type covering the inner portion of the mould for facilitating the stripping of the resulting article, whether the latter constitutes a final object or an intermediate element.

Figure 2:
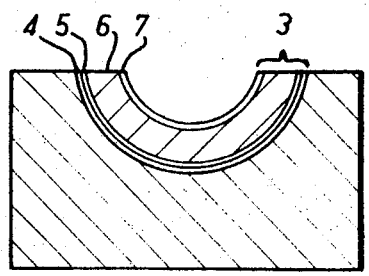
FIG. 2 is a section taken along the line A–B of FIG. 1, showing the position of the successive layers deposited thereon, but coarsely exaggerated to illustrate more clearly the disclosure.
Figure 3:
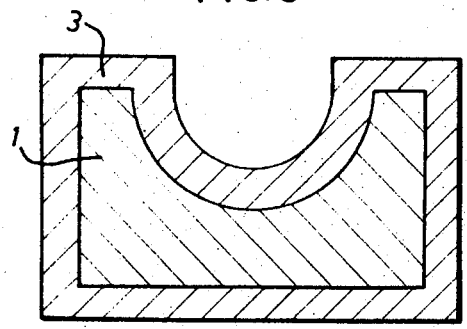
FIG. 3 is a modified embodiment of the structure of FIG. 2, wherein the metal coatings surround completely the half-mould portion comprising the moulding cavity or impression.

The method of this invention is applicable in a particularly advantageous manner to precision moulding of the lost-wax or lost-pattern type. In this case, the metal layers are deposited on the inner face of the mould which comprises the data to be reproduced, under the above-defined conditions, and as illustrated in FIGS. 2 and 3, while endeavouring to obtain a high-fidelity reproduction of the design by the metal films thus formed.

Then, in the thus coated cavity the material constituting the lost pattern (wax, urea, etc.) is cast or poured and this material, after setting and due to the presence of chromium, is easily stripped and completely free of any detrimental trace likely to interfere with the subsequent operations.

The pattern thus obtained is then used for forming the mould to be filled with the material for making the final article, possibly of metal.

The mould in which the final article is to be eventually shaped is then obtained by covering the intermediate lost pattern with a ceramic paste which is subsequently dried.

This material, which is then completely free of any anti-wetting action produced by traces of the nonstick agent which are carried by the lost pattern can cover more regularly all the mould surface, even in its most remote nooks and corners, thus giving a considerably truer reproduction of the pattern while permitting a considerable gain of time and eliminating the preliminary coating of the mould surface with nonstick agents as well as the careful subsequent cleaning of the moulded article.

Of course, the above description is given by way of example only and should not be construed as limiting the scope of the invention. Thus, it would not constitute a departure from the basic principles thereof to replace various steps and details by other equivalent means, for example by replacing the varnish layer containing conducting particles with a gun-sprayed fine zinc powder according to the well-known Schori method.

Moreover, it is clear that the present invention comprises not only the method of making nonstick moulds as described hereinabove but also the devices necessary for carrying out same as well as the articles obtained according to this method.

What is claimed as new is:

1. A method for applying a nonsticking surface treatment to the inner surface of a mold formed from a polymeric resin, which mold comprises a relief pattern on its surface, comprising:

coating said inner surface with a coat of varnish including
 (A) fine particles of conductive powder of an element selective from the group consisting of silver, copper, aluminum, zinc, and carbon; and
 (B) an element having a high degree of affinity with the mold material
whereby a varnish coat is formed which is strongly bonded with said mold material;
chemically depositing a copper film onto the varnish coated inner surface of the mold by chemical reduction of a copper compound;
then electrolytically depositing a film of metal selected from the group consisting of copper and nickel onto the copper coated inner surface of the mold; and
then electrolytically depositing a film of chromium over the thrice-coated inner surface of the mold.

References Cited
UNITED STATES PATENTS

| | | | |
|---|---|---|---|
| 2,206,908 | 7/1940 | Lunt | 204—23 |
| 3,022,231 | 2/1962 | Broderick | 204—25 |
| 2,768,133 | 10/1956 | Lundbye | 204—20 |
| 3,445,350 | 5/1969 | Klinger et al. | 204—30 |
| 3,471,320 | 10/1969 | Sanbestre et al. | 204—30 |
| 3,558,443 | 1/1971 | Khelghatian et al. | 204—30 |
| 3,562,163 | 2/1971 | Young et al. | 204—30 |
| 2,211,582 | 8/1940 | Ruben | 204—30 |
| 1,126,211 | 1/1915 | Heller | 204—30 |

FOREIGN PATENTS

| | | | |
|---|---|---|---|
| 632,377 | 12/1961 | Canada | 204—41 |

OTHER REFERENCES

Plating on Plastics by C. C. Weekly Plating, January 1966, pp. 107–109.

JOHN H. MACK, Primary Examiner

T. TURFARIELLO, Assistant Examiner

U.S. Cl. X.R.

204—30, 41; 249—115